United States Patent
Han et al.

(10) Patent No.: US 9,491,781 B2
(45) Date of Patent: Nov. 8, 2016

(54) RANDOM ACCESS CHANNEL ENHANCEMENT FOR CARRIER AGGREGATION WITH DIFFERENT UPLINK/DOWNLINK CONFIGURATION

(75) Inventors: Jing Han, Beijing (CN); Wei Bai, Beijing (CN); Erlin Zeng, Beijing (CN); Chunyan Gao, Beijing (CN); Haiming Wang, Beijing (CN); Wei Hong, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 138 days.

(21) Appl. No.: 14/375,887

(22) PCT Filed: Feb. 1, 2012

(86) PCT No.: PCT/CN2012/070823
§ 371 (c)(1),
(2), (4) Date: Jul. 31, 2014

(87) PCT Pub. No.: WO2013/113158
PCT Pub. Date: Aug. 8, 2013

(65) Prior Publication Data
US 2014/0376425 A1    Dec. 25, 2014

(51) Int. Cl.
*H04J 3/00* (2006.01)
*H04W 74/08* (2009.01)
(Continued)

(52) U.S. Cl.
CPC ............ *H04W 74/0833* (2013.01); *H04L 5/14* (2013.01); *H04W 74/0866* (2013.01); *H04W 72/042* (2013.01); *H04W 72/0413* (2013.01); *H04W 74/008* (2013.01)

(58) Field of Classification Search
USPC .................. 370/252–280, 311–329, 286; 455/450–522
See application file for complete search history.

(56) References Cited

U.S. PATENT DOCUMENTS

| 8,139,548 | B2 * | 3/2012 | Park | H04B 1/126 370/286 |
| 9,008,050 | B2 * | 4/2015 | Feuersanger | H04W 52/281 370/336 |

(Continued)

FOREIGN PATENT DOCUMENTS

CN    102025411    4/2011

OTHER PUBLICATIONS

R1-113452; 3GPP TSG-RAN WG1 #66bis; Zhuhai, China, Oct. 10-14, 2011; "Discussion on Support of Different TDD-DL Configurations on Different Bands" (6 pages).

(Continued)

*Primary Examiner* — Man Phan
(74) *Attorney, Agent, or Firm* — Oblon, McClelland, Maier & Neustadt, L.L.P.

(57) ABSTRACT

The present invention relates to methods, apparatuses and a computer program product for random access channel enhancement for carrier aggregation with different uplink/downlink configuration. The present invention includes detecting, at a user equipment, a downlink control channel in a specific downlink subframe on a first component carrier, receiving, at the user equipment, a downlink shared channel on the first component carrier, and transmitting, after a predetermined period, a random access channel in a specific uplink subframe on a second component carrier, the specific uplink subframe overlapping the specific downlink subframe on the first component carrier.

20 Claims, 9 Drawing Sheets

(51) Int. Cl.
*H04L 5/14* (2006.01)
*H04W 74/00* (2009.01)
*H04W 72/04* (2009.01)

(56) References Cited

U.S. PATENT DOCUMENTS

| | | | |
|---|---|---|---|
| 9,130,718 B2* | 9/2015 | Dai | H04L 5/0007 |
| 9,137,804 B2* | 9/2015 | Lin | H04W 72/048 |
| 9,236,986 B2* | 1/2016 | Park | H04L 5/0044 |
| 2008/0064432 A1 | 3/2008 | Park et al. | |
| 2013/0242881 A1* | 9/2013 | Wang | H04L 1/18 370/329 |
| 2014/0092840 A1* | 4/2014 | Zeng | H04L 1/1861 370/329 |
| 2015/0036605 A1* | 2/2015 | Kim | H04W 52/146 370/329 |
| 2015/0085715 A1* | 3/2015 | Sun | H04B 7/2656 370/280 |
| 2015/0103703 A1* | 4/2015 | Zeng | H04W 72/14 370/280 |
| 2015/0110010 A1* | 4/2015 | Wei | H04L 5/0098 370/329 |
| 2015/0282174 A1* | 10/2015 | Takeda | H04W 72/1268 370/329 |

OTHER PUBLICATIONS

RP-091440; 3GPP TSG RAN#46; Sanya, P.R. China, Dec. 1-4, 2009; Nokia Corporation; "Work Item Description: Carrier Aggregation for LTE" (6 pages).

RP-110451; 3GPP TSG RAN Meeting #51; Kansas City, USA, Mar. 15-18, 2011; Nokia Corporation, Nokia Siemens Networks; "LTE Carrier Aggregation Enhancements" (7 pages).

* cited by examiner

RANDOM ACCESS CHANNEL ENHANCEMENT FOR CARRIER AGGREGATION WITH DIFFERENT UPLINK/DOWNLINK CONFIGURATION

FIELD OF THE INVENTION

The present invention relates to random access channel enhancement for carrier aggregation with different uplink/downlink configuration. More particularly, the present invention relates to methods, apparatuses and a computer program product for RACH (Random Access Channel) enhancement for inter-band TDD CA (Time Division Duplex Carrier Aggregation) with different TDD DL/UL (Downlink/Uplink) configuration.

BACKGROUND

The Release 10 Working Item in 3GPP ($3^{rd}$ Generation Partnership Project) standardization on LTE (Long Term Evolution) carrier aggregation for LTE mainly focused on LTE FDD (Frequency Division Duplex) (cf. document [1]). In Release 11, further mechanisms will be addressed to support inter-band carrier aggregation for LTE TDD DL and UL including different uplink-downlink configurations on different bands (cf. document [2]).

Figure 1:
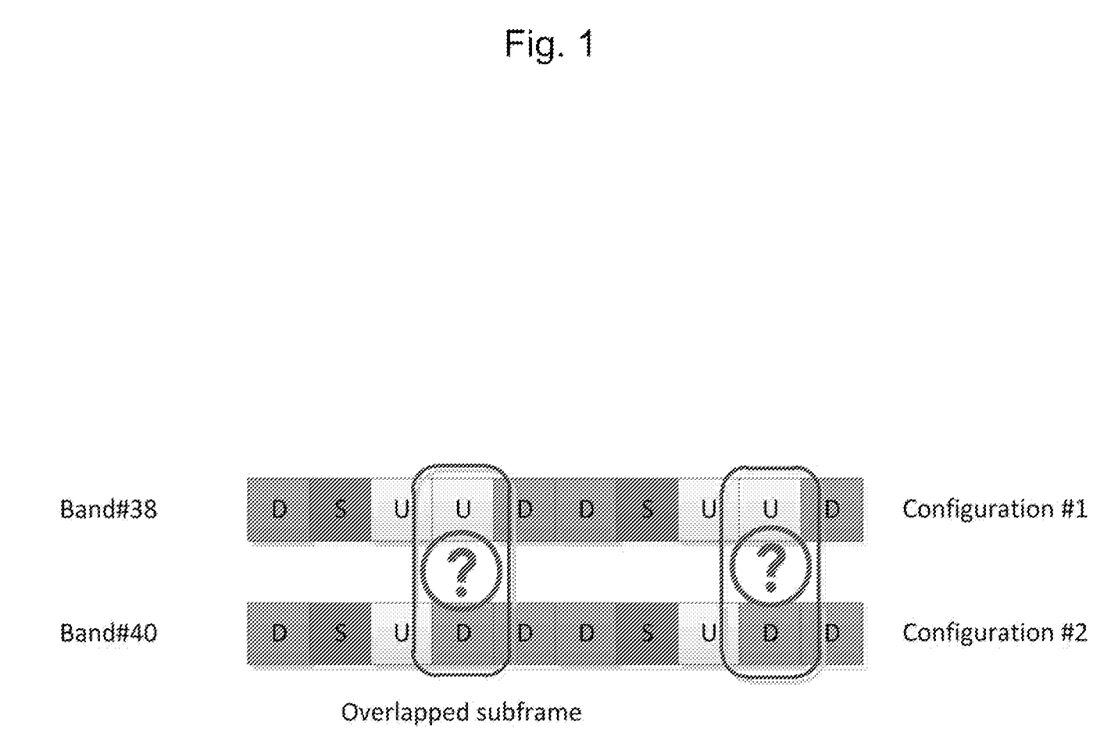
FIG. 1 illustrates an example of TDD inter-band CA that supports different TDD DL/UL configurations.

FIG. 1 illustrates an example of TDD inter-band CA that supports different TDD DL/UL configurations.

In current discussion in 3GPP, e.g. RAN1#66bis meeting, half duplex mode TDD UE (User Equipment) is possible to be regarded as the baseline solution for inter-band CA with different TDD DL/UL configurations. That is to say, half duplex mode TDD UE are not allowed to do simultaneous transmission and reception in an overlapped subframe, although it may have two sets of RF (Radio Frequencies). Thus, the transmission direction of the overlapped subframe needs to be decided when TDD UE copes with such subframes. One possible way forward is to use the similar method as FDD HD (Half Duplex) UEs, i.e. dynamically determining the transmission direction of the overlapped subframes according to UL grant or UL feedback, which is proposed in document [3].

This method is the possible way forward since it is already used in previous FDD HD mode. And now for TDD inter-band CA, one problem is how to cope with RACH transmission in the overlapped subframe.

According to the present invention there is proposed one RACH enhancement method for inter-band TDD CA with different DL/UL configuration.

According to the overlapped subframe transmission direction scheme as mentioned above, UE will regard overlapped subframe as UL subframe, if there is RA (Random Access) preamble transmission or RA Msg3 transmission. But meanwhile, eNB is not aware if UE is going to transmit RA preamble and RA Msg3 for contention-based RA in which UE will randomly select one RA preamble and decide the timeslot of preamble transmission by itself. Thus, it is still possible that the eNB schedules DL transmission in the overlapped subframe. Then, this DL assignment will be missed by UE. This is illustrated in FIG. 2.

Figure 2:
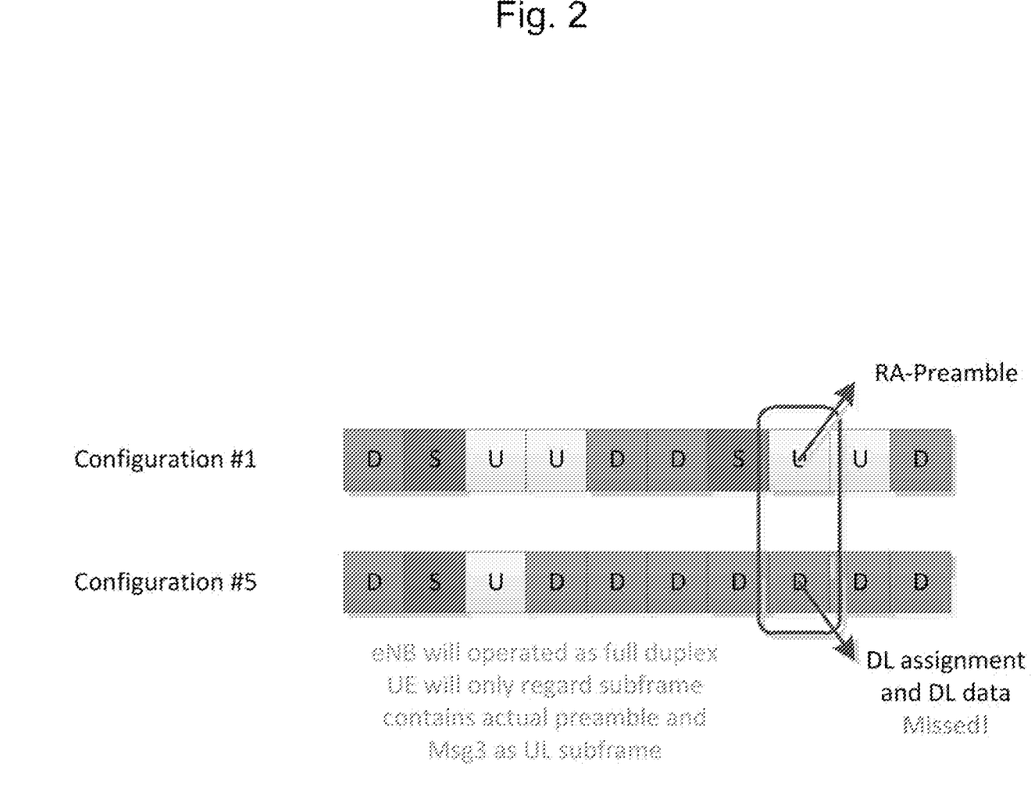
FIG. 2 illustrates a RACH problem for inter-band TDD CA with different DL/UL configurations.

In FIG. 2, for overlapped subframe in black block, if there is a RA-preamble to be transmitted, UE will regard this overlapped subframe as UL subframe, i.e. UE will transmit RA preamble in the UL subframe and ignore DL subframe of this overlapped subframe. Since eNB is not aware of the PRACH transmission from UE, when eNB transmits a DL grant in the same subframe, it may consider that the DL grant is missed at the UE. As a result, eNB may increase the PDCCH (Physical Downlink Control Channel) aggregation level for better performance or even trigger some updates to PDCCH OLLA (Open Loop Link Adaptation). Then OLLA performance is impacted and more resource could be wasted.

Such an issue at least exists in the following scenarios.

The first scenario relates to a D-SR failure. In such a case, the UE initiates RACH on UL subframe of overlapped subframe. Then, UL subframe is prioritized, and DL subframe is ignored.

The second scenario relates to a case where the eNB triggered a contention-based RA. In such a case, the eNB triggered a contention-based RACH, and UE initiates RACH on UL subframe of overlapped subframe. This case could be happened when e.g. eNB triggered RACH on Scell to get TA on Scell in multiple-TA scenario in CA.

RELATED DOCUMENTS

[1] RP-091440, "Carrier Aggregation for LTE", 3GPP RAN, December 2009.
[2] RP-110451, "LTE Carrier Aggregation Enhancements", 3GPP RAN#51, March 2011.
[3] R1-113452, Discussion on support of different TDD UL-DL configurations on different bands, CMCC.

SUMMARY OF THE INVENTION

It is an object of the present invention, to provide a RACH enhancement method for inter-band TDD CA with different DL/UL configuration.

According to exemplary aspects of the present invention, there are provided methods, apparatuses and a computer program product for random access channel enhancement for carrier aggregation with different uplink/downlink configuration.

Various aspects of exemplary embodiments of the present invention are set out in the appended claims.

According to an exemplary aspect of the present invention, there is provided a method, comprising:
  detecting, at a user equipment, a downlink control channel in a specific downlink subframe on a first component carrier,
  receiving, at the user equipment, a downlink shared channel on the first component carrier, and
  transmitting, after a predetermined period, a random access channel in a specific uplink subframe on a second component carrier, the specific uplink subframe overlapping the specific downlink subframe on the first component carrier.

According to another exemplary aspect of the present invention, there is provided a method, comprising:
  determining, at a user equipment, that a random access preamble is to be transmitted to a base station in a specific uplink subframe on a first component carrier,
  transmitting, at a user equipment, to a base station, in an uplink subframe on a second component carrier preceding the specific uplink subframe on the first component carrier, an indication that a random access preamble is transmitted in the specific uplink subframe on the first component carrier, and
  transmitting, at the user equipment, the random access preamble in the specific uplink subframe on the first component carrier.

According to another exemplary aspect of the present invention, there is provided a method, comprising:
- receiving, at a base station, an indication from a user equipment indicating that a random access preamble is transmitted to a base station in a specific uplink subframe on a first component carrier,
- determining, at the base station, not to schedule downlink transmission in a downlink subframe on a second component carrier overlapping the specific uplink subframe on the first component carrier.

According to another exemplary aspect of the present invention, there is provided an apparatus, comprising:
- at least one processor,
- and at least one memory including computer program code, the at least one memory and the computer program code arranged to, with the at least one processor, cause the apparatus at least to perform
- detecting a downlink control channel in a specific downlink subframe on a first component carrier,
- receiving a downlink shared channel on the first component carrier,
- transmitting, after a predetermined period, a random access channel in a specific uplink subframe on a second component carrier, the specific uplink subframe overlapping the specific downlink subframe on the first component carrier.

According to another exemplary aspect of the present invention, there is provided an apparatus, comprising:
- at least one processor,
- and at least one memory including computer program code, the at least one memory and the computer program code arranged to, with the at least one processor, cause the apparatus at least to perform
- determining that a random access preamble is to be transmitted to a base station in a specific uplink subframe on a first component carrier,
- transmitting, to a base station, in an uplink subframe on a second component carrier preceding the specific uplink subframe on the first component carrier, an indication that a random access preamble is transmitted in the specific uplink subframe on the first component carrier, and transmitting the random access preamble in the specific uplink subframe on the first component carrier.

According to another exemplary aspect of the present invention, there is provided an apparatus, comprising:
- at least one processor,
- and at least one memory including computer program code, the at least one memory and the computer program code arranged to, with the at least one processor, cause the apparatus at least to perform
- receiving an indication from a user equipment indicating that a random access preamble is transmitted to a base station in a specific uplink subframe on a first component carrier,
- determining not to schedule downlink transmission in a downlink subframe on a second component carrier overlapping the specific uplink subframe on the first component carrier.

According to another exemplary aspect of the present invention, there is provided an apparatus, comprising:
- means for detecting a downlink control channel in a specific downlink subframe on a first component carrier,
- means for receiving a downlink shared channel on the first component carrier,
- means for transmitting, after a predetermined period, a random access channel in a specific uplink subframe on a second component carrier, the specific uplink subframe overlapping the specific downlink subframe on the first component carrier.

According to another exemplary aspect of the present invention, there is provided an apparatus, comprising:
- means for determining that a random access preamble is to be transmitted to a base station in a specific uplink subframe on a first component carrier,
- means for transmitting, to a base station, in an uplink subframe on a second component carrier preceding the specific uplink subframe on the first component carrier, an indication that a random access preamble is transmitted in the specific uplink subframe on the first component carrier, and
- for transmitting the random access preamble in the specific uplink subframe on the first component carrier.

According to another exemplary aspect of the present invention, there is provided an apparatus, comprising:
- means for receiving an indication from a user equipment indicating that a random access preamble is transmitted to a base station in a specific uplink subframe on a first component carrier,
- means for determining not to schedule downlink transmission in a downlink subframe on a second component carrier overlapping the specific uplink subframe on the first component carrier.

According to another exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is arranged to cause the computer to carry out the method according to any one of the aforementioned method-related exemplary aspects of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the dependent claims.

According to the proposed RACH enhancement scheme, there is enabled both DL reception and UL transmission in an overlapped subframe for half duplex mode TDD UEs for inter-band TDD CA with different TDD configuration. Further, the OLLA impact of missing PDCCH in overlapped subframe is avoided.

BRIEF DESCRIPTION OF THE DRAWINGS

For a more complete understanding of exemplary embodiments of the present invention, reference is now made to the following description taken in connection with the accompanying drawings in which.

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for RACH enhancement for inter-band TDD CA with different TDD DL/UL configuration.

In the following description of certain embodiments of the present invention, it is assumed that for a given subframe, it is a UL subframe in CC (Component Carrier) #1 and a DL subframe in CC #5 according to the TDD UL/DL configurations that are predefined via higher layer. The overlap subframe direction is dynamically determined by the detection of a UL grant or DL grant in a previous subframe.

For example, if UE detects that there is a UL grant sent by eNB for the UL subframe in CC #1, or UE determines that some UL A/N feedback needs to be transmitted in the UL subframe in CC #1 due to a previously scheduled PDSCH, UE will regard the overlapped subframe as UL subframe and transmits in UL of CC #1. Otherwise, UE will monitor DL control signaling in the DL of CC #5.

In the following, there are described two embodiments for solving the issues according to the first and second scenario, as described above.

The first embodiment applies to both the first and second scenario, and the second embodiment applies to the second scenario.

According to the first embodiment, DL reception and UL transmission are both enabled in an overlapped subframe by time domain multiplexing.

If there is no UL grant corresponding to an overlapped subframe #k detected, and if UE needs to transmit a PRACH preamble in the subframe #k, the following cases occur:

UE will first try blind detection for PDCCHs in CC #5, and if there is a DL grant detected, UE shall receive PDSCH from CC #5 according to a short PDSCH format.

After the reception of the PDSCH, UE shall switch to the UL of CC #1, for which a guard period is predefined.

After guard period, UE will send short RACH in some or all the OFDM symbols following the guard period within the subframe.

The use of such procedure for the overlapped subframes is configured by eNB via higher layer signaling If configured, eNB and UE will assume short PDSCH if any in the DL of CC #5.

Figure 3:
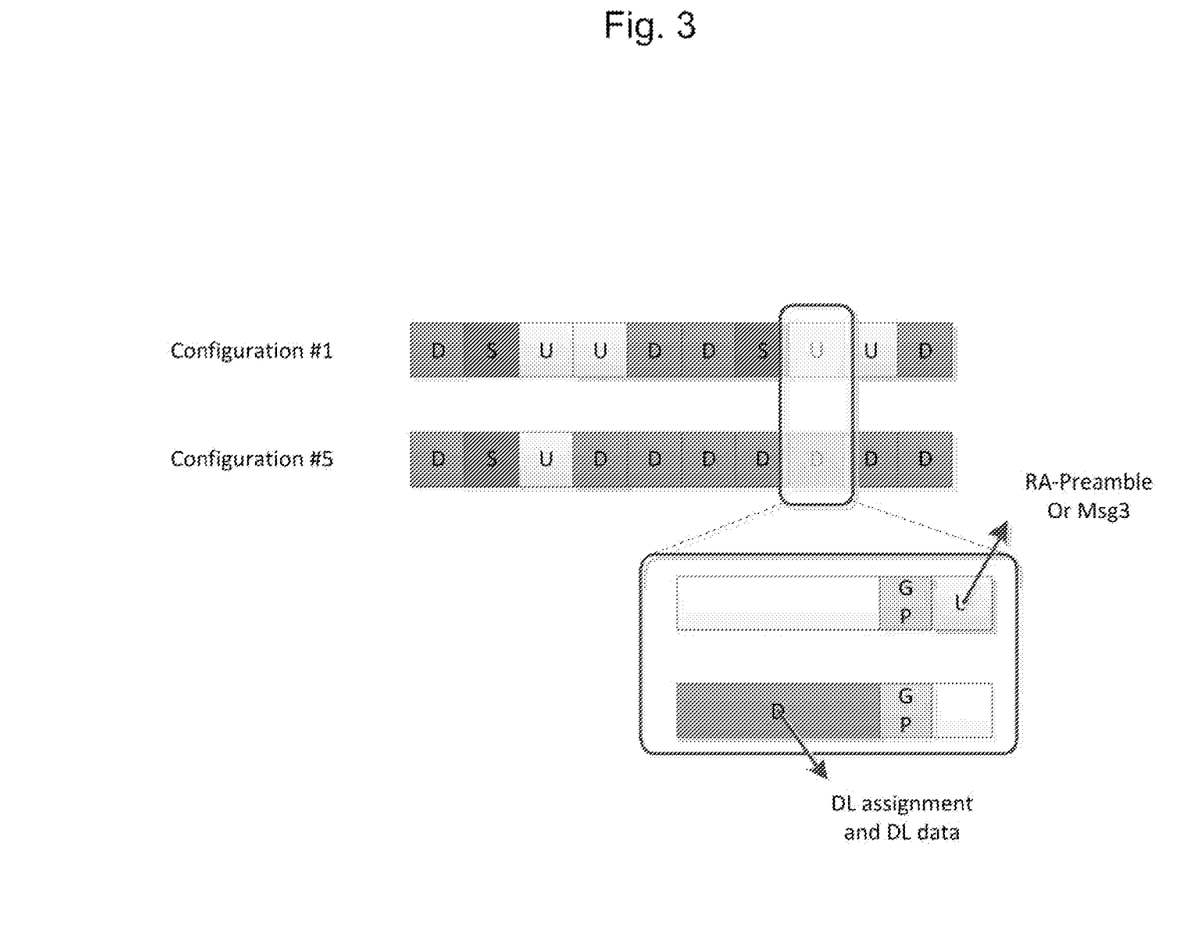
FIG. 3 illustrates an example of a special subframe similar structure for overlapped subframes according to certain embodiments of the present invention.

According to the first embodiment, when a contention-based RA is initiated by UE or eNB, and UE will transmit RA preamble or RA Msg3 in the overlapped subframe. In such a case, a special subframe similar format could be used for such overlapped subframe. FIG. 3 shows an example for a special subframe similar structure for the overlapped subframe.

In such kind of overlapped subframe, UE will first detect PDCCH, if there is DL transmission, then receive PDSCH in short format that is similar to DwPTS (Downlink Pilot Time Slot). After a guard period, UE will send short RACH in symbols that are similar to UpPTS (Uplink Pilot Time Slot).

Such kind of overlapped subframe is configured by higher layer, e.g. RRC (Radio Resource Controller) signaling to semi-statically enable such kind of structure. That is to say, when such feature is configured, eNB will always use short PDSCH in such subframes and UE will always use short RACH in such subframes.

In practice, the length of PDSCH region and the format used for short RACH can follow the LTE Rel-8 specification of DwPTS field and PRACH format 4 for a TDD special subframe, but of course is not limited thereto.

According to the first embodiment, there is allowed PDSCH reception and short PRACH transmission in the same subframe.

According to the second embodiment, the UE will report RACH transmission to eNB by UL signaling or data transmission.

In such a case, the indication of RACH transmission could be done before the actual RA transmission happens. Further, the indication could include the location of RA transmission and selected preamble sequence or used resource of Msg3, but is not limited to this.

According to the second embodiment, the UE could use UL report to indicate to the eNB that there will be RA-preamble transmission or RA-Msg3 transmission by UL control signaling or MAC CE that is transmitted together with data, before the actual RA transmission happens. This is shown in the FIG. 4, which illustrates an indication of the RA transmission.

Figure 4:
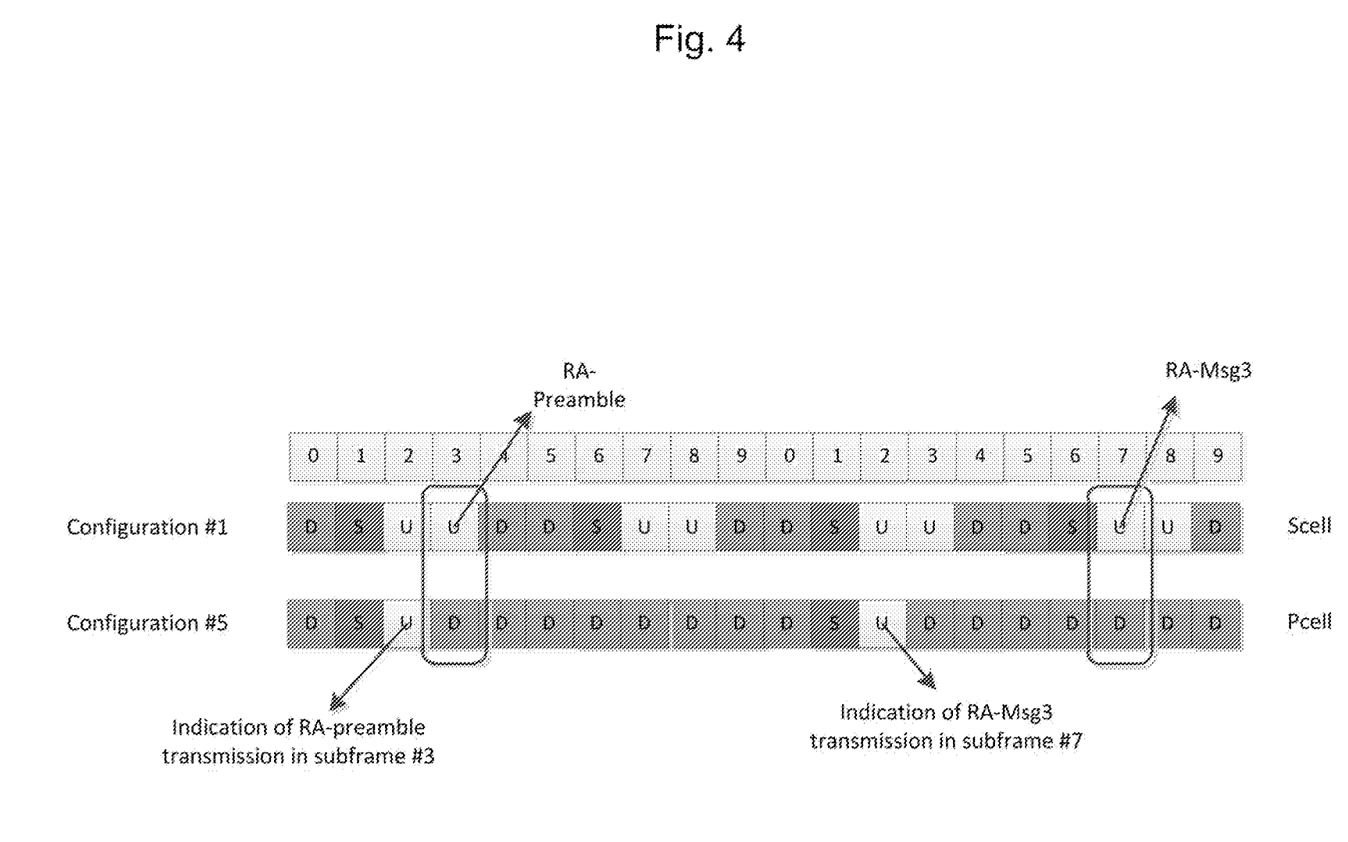
FIG. 4 illustrates an example for an indication of RA transmission according to certain embodiment of the present invention.

In FIG. 4, for example, if UE has determined RA-preamble transmission in subframe #3 beforehand, UE could indicate such transmission in UL subframe #2 before the overlapped subframe. Similarly, UE could indicate eNB about RA-Msg3 transmission in subframe #2. This indication could be transmitted in UL control channel or MAC CE with UL data transmission. As an example, when eNB triggers a UE for contention based RACH on Scell for the sake of UL synchronization, some UL control or data channel can be predefined or configured on the Pcell to the same UE in advance, so that UE can transmit an indication in those resources.

In the second embodiment, there is allowed the normal PRACH format in the overlapped subframe. With the report from UE to eNB, it is possible that eNB avoids any DL scheduling in the subframe. With this, it is possible to avoid the potential impact to PDCCH OLLA.

In view of the above, the proposed RACH enhancement scheme according to certain embodiments of the present invention enables both DL reception and UL transmission in an overlapped subframe for half duplex mode TDD UE for inter-band TDD CA with different TDD configurations. Further, it avoids the OLLA impact of missing PDCCH in overlapped subframes.

Figure 5:
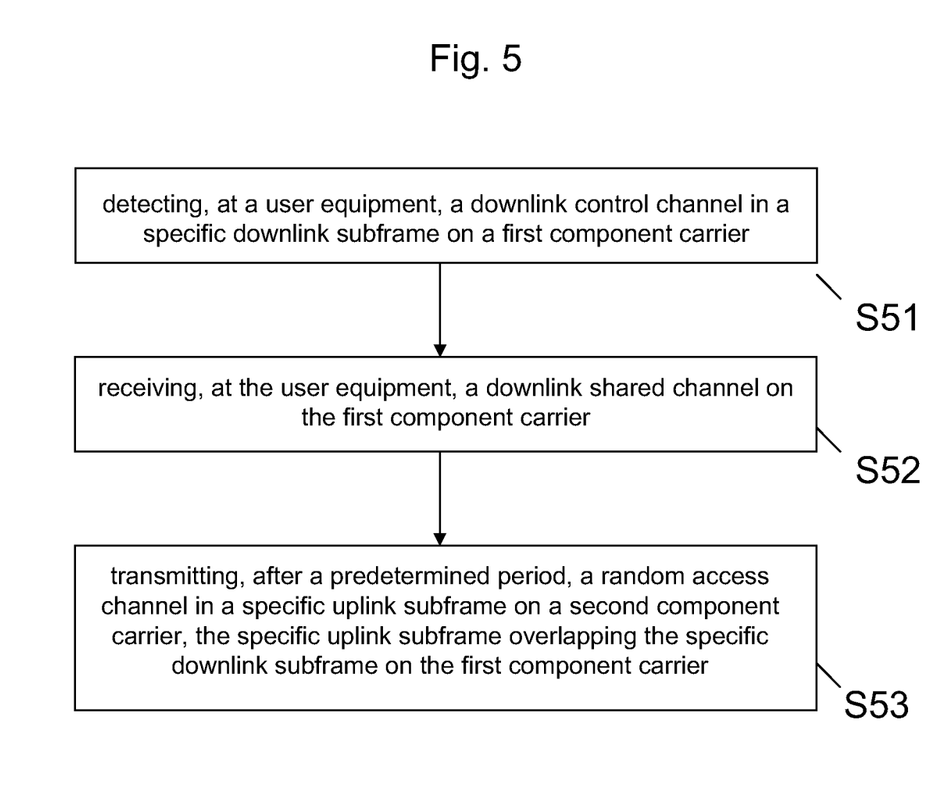
FIG. 5 shows a principle flowchart of an example for a method according to certain embodiments of the present invention.

FIG. 5 shows a principle flowchart of an example for a method according to certain embodiments of the present invention. That is, as shown in FIG. 5, this method comprises detecting, at a user equipment, in a step S51, a downlink control channel in a specific downlink subframe on a first component carrier. Further, the method comprises receiving, at the user equipment, in a step S52, a downlink shared channel on the first component carrier, and transmitting, in a step S53, after a predetermined period, a random access channel in a specific uplink subframe on a second component carrier, the specific uplink subframe overlapping the specific downlink subframe on the first component carrier.

According to further exemplary embodiments of the present invention, the random access channel is transmitted after a predetermined period from the reception of the downlink shared channel has elapsed.

According to further exemplary embodiments of the present invention, the downlink shared channel has a short format according to a downlink pilot time slot field.

According to further exemplary embodiments of the present invention, the random access channel has a short format according to physical random access channel format 4 for a time division duplex special subframe.

Figure 6:
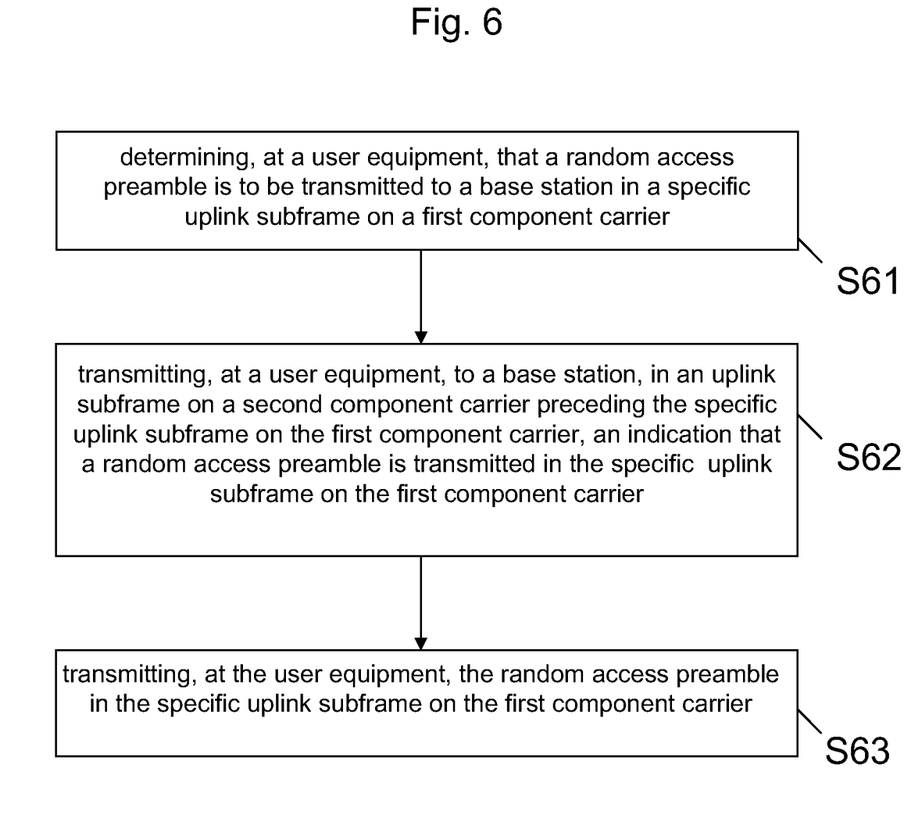
FIG. 6 shows a principle flowchart of another example for a method according to certain embodiments of the present invention.

FIG. 6 shows a principle flowchart of an example for a method according to certain embodiments of the present invention. That is, as shown in FIG. 6, this method comprises determining, at a user equipment in a step S61, that a random access preamble is to be transmitted to a base station in a specific uplink subframe on a first component carrier. Further, in a step S62, the method comprises transmitting from a user equipment to a base station, in an uplink subframe on a second component carrier preceding the specific uplink subframe on the first component carrier, an indication that a random access preamble is transmitted in the specific uplink subframe on the first component carrier. Further, the method comprises transmitting, in a step S63 by the user equipment, the random access preamble in the specific uplink subframe on the first component carrier.

According to further exemplary embodiments of the present invention, the method further comprises determining, at the user equipment, that a random access Message 3 is to be transmitted to the base station in a specific uplink subframe on a first component carrier, transmitting, at the user equipment, to a base station, in an uplink subframe on a second component carrier preceding the specific uplink subframe on the first component carrier, an indication that a random access preamble is transmitted in the specific uplink subframe on the first component carrier, and transmitting, at the user equipment, the random access Message 3 in the specific uplink subframe on the first component carrier.

According to further exemplary embodiments of the present invention, the indication is transmitted in an uplink control channel; the uplink control channel is predefined by the base station; the indication is transmitted in a MAC CE with uplink data transmission in an uplink data channel; the uplink data channel is predefined by the base station.

Figure 7:
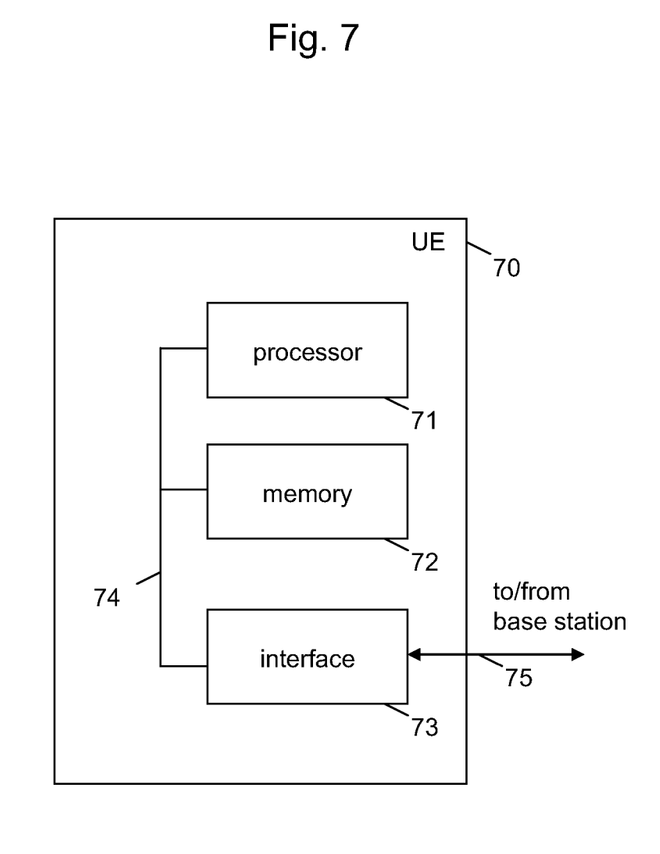
FIG. 7 shows a principle configuration of an example for a user equipment according to certain embodiments of the present invention.

FIG. 7 shows a principle configuration of an example for an apparatus according to certain embodiments of the present invention. One option for implementing this example for an apparatus according to certain embodiments of the present invention would be a component in a handset such as user equipment UE according to LTE.

Specifically, as shown in FIG. 7, the example for a user equipment 70 comprises at least one processor 71, at least one memory 72 including computer program code and an interface 73 which are connected by a bus 74 or the like. The at least one memory and the computer program code are arranged to, with the at least one processor, cause the apparatus at least to perform detecting a downlink control channel in a specific downlink subframe on a first component carrier, receiving a downlink shared channel on the first component carrier, and transmitting, after a predetermined period, a random access channel in a specific uplink subframe on a second component carrier, the specific uplink subframe overlapping the specific downlink subframe on the first component carrier.

According to further exemplary embodiments of the present invention, the at least one memory and the computer program code are further arranged to, with the at least one processor, cause the apparatus at least to perform determining, that a random access preamble is to be transmitted to a base station in a specific uplink subframe on a first component carrier, transmitting, to a base station, in an uplink subframe on a second component carrier preceding the specific uplink subframe on the first component carrier, an indication that a random access preamble is transmitted in the specific uplink subframe on the first component carrier, and transmitting, at the user equipment, the random access preamble in the specific uplink subframe on the first component carrier.

For further functions of the user equipment according to further exemplary embodiments of the present invention, reference is made to the flowcharts shown in FIGS. 5 and 6, respectively, and the above description.

Figure 8:
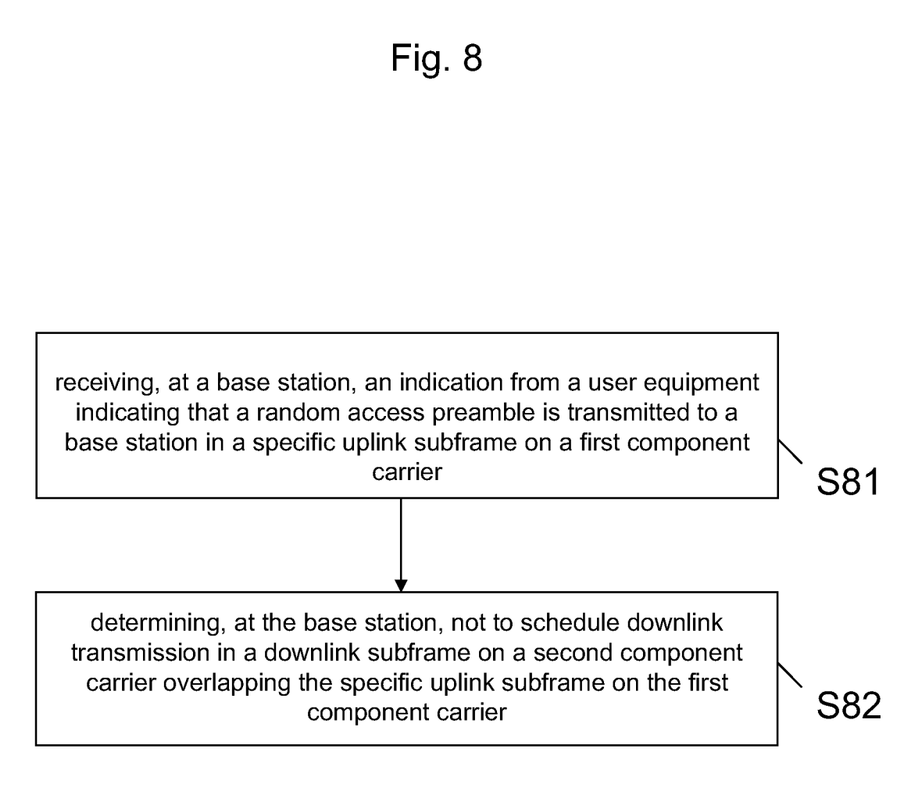
FIG. 8 shows a principle flowchart of another example for a method according to certain embodiments of the present invention.

FIG. 8 shows a principle flowchart of another example for a method according to certain embodiments of the present invention. That is, as shown in FIG. 8, this method comprises receiving, in a step S81, at a base station, an indication from a user equipment indicating that a random access preamble is transmitted to a base station in a specific uplink subframe on a first component carrier, and determining in a step S82, at the base station, not to schedule downlink transmission in a downlink subframe on a second component carrier overlapping the specific uplink subframe on the first component carrier.

According to further exemplary embodiments of the present invention, the indication is transmitted in an uplink control channel, and the uplink control channel is predefined by the base station.

Figure 9:
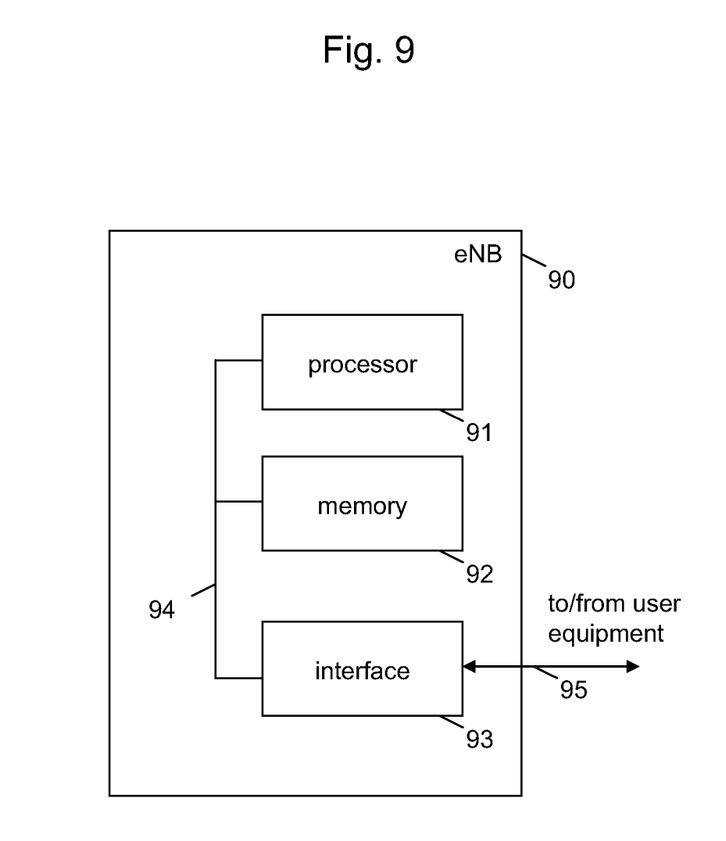
FIG. 9 shows a principle configuration of an example for a base station according to certain embodiments of the present invention.

FIG. 9 shows a principle configuration of another example for an apparatus according to certain embodiments of the present invention. One option for implementing this example for an apparatus according to certain embodiments of the present invention would be a base station according to LTE.

Specifically, as shown in FIG. 9, the example for a base station 90 comprises at least one processor 91, at least one memory 92 including computer program code and an interface 93 which are connected by a bus 94 or the like. The at least one memory and the computer program code are arranged to, with the at least one processor, cause the apparatus at least to perform receiving an indication from a user equipment indicating that a random access preamble is transmitted to a base station in a specific uplink subframe on a first component carrier, and determining not to schedule downlink transmission in a downlink subframe on a second component carrier overlapping the specific uplink subframe on the first component carrier.

For further functions of the user equipment according to further exemplary embodiments of the present invention, reference is made to the flowchart shown in FIG. 8 and the above description.

In the foregoing exemplary description of the apparatus, i.e. the user equipment and the base station, only the units that are relevant for understanding the principles of the invention have been described using functional blocks. The apparatus may comprise further units that are necessary for its respective operation as user equipment or base station, respectively. However, a description of these units is omitted in this specification. The arrangement of the functional blocks of the devices is not construed to limit the invention, and the functions may be performed by one block or further split into sub-blocks. Further, the apparatuses, i.e. the user equipment and the base station, may be connected via a link 75/95. The link 75/95 may be a physical and/or logical coupling, which is implementation-independent (e.g. wired or wireless).

According to exemplarily embodiments of the present invention, a system may comprise any conceivable combination of the thus depicted devices/apparatuses and other network elements, which are arranged to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package (SIP), or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable. That is, for example, it is possible to perform the above mentioned timing advance procedure and the connectivity adjustment procedure either individually or in combination.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

ABBREVIATIONS

BCH Broadcast Channel
CA Carrier Aggregation
CC Component Carrier
CP Control Plane
DL DownLink
DwPTS Downlink Pilot Time Slot
D-SR Dedicated Scheduling Request
E-UTRAN Evolved Universal Terrestrial Radio Access Network
ENB Evolved Node B HD Half Duplex
LTE-A Long Term Evolution-Advanced
MAC Medium Access Control
MAC CE MAC Control Element
RA Random Access
RACH Random Access CHannel
RF Radio Frequency
RRC Radio Resource Control
TA Time Alignment
TDD Time Division Duplex
UE User Equipment
UL UpLink
OFDM Orthogonal Frequency Division Multiplexing
OLLA Open Loop Link Adaptation
PDCCH Physical Downlink Control CHannel
PDSCH Physical Downlink Shared CHannel
PRACH Physical Random Access CHannel

What is claimed is:

1. An apparatus, comprising:
   circuitry configured to
      detect a downlink control channel in a specific downlink subframe on a first component carrier;
      receive a downlink shared channel on the first component carrier; and
      transmit, after a predetermined guard period that follows the reception of the downlink shared channel on the first component carrier, a random access channel within one or more symbols remaining in a specific uplink subframe on a second component carrier, the specific uplink subframe overlapping with the specific downlink subframe on the first component carrier.

2. The apparatus according to claim 1, wherein the downlink shared channel has a short format according to a downlink pilot time slot field.

3. The apparatus according to claim 1, wherein the random access channel has a short format according to physical random access channel format 4 for a time division duplex special subframe.

4. The apparatus according to claim 1, wherein the overlapped specific uplink subframe and specific downlink subframe are predefined by a base station by higher layer signaling.

5. The apparatus according to claim 4, wherein the higher layer signaling is radio resource controller (RRC) signaling.

6. The apparatus according to claim 1, wherein the downlink control channel is a physical downlink shared channel (PDSCH).

7. The apparatus according to claim 6, wherein the circuitry is configured to find, on the first component carrier through blind detection prior to detection of the PDSCH, a downlink grant that schedules the PDSCH in the specific downlink subframe.

8. The apparatus according to claim 1, wherein the specific uplink subframe and the specific downlink subframe overlap by time domain multiplexing.

9. The apparatus according to claim 1, wherein the circuitry is configured to find, on the first component carrier through blind detection prior to detection of the downlink control channel, a downlink grant that schedules the downlink control channel in the specific downlink subframe.

10. An apparatus, comprising:
    circuitry configured to
       determine that a random access preamble is to be transmitted to a base station in a specific uplink subframe on a first component carrier;
       transmit, to a base station, in an uplink subframe on a second component carrier preceding the specific uplink subframe on the first component carrier, an indication that a random access preamble is transmitted in the specific uplink subframe on the first component carrier;
       transmit the random access preamble in the specific uplink subframe on the first component carrier;
       determine that a random access message 3 is to be transmitted to the base station in the specific uplink subframe on the first component carrier; and
       transmit, to the base station, the random access message 3 in the specific uplink subframe on the first component carrier.

11. The apparatus according to claim 10, wherein the indication is transmitted in an uplink control channel.

12. The apparatus according to claim 11, wherein the uplink control channel is predefined by the base station.

13. The apparatus according to claim 10, wherein the indication is transmitted in a Medium Access Control Control Element (MAC CE) with uplink data transmission in an uplink data channel.

14. The apparatus according to claim 13, wherein the uplink data channel is predefined by the base station.

15. The apparatus according to claim 10, wherein
    the circuitry is of a user equipment for which the secondary component carrier is a primary component carrier and the first component carrier is a secondary component carrier, and
    the circuitry is configured to be triggered by the base station for a contention based random access procedure on the secondary component carrier for uplink synchronization.

16. The apparatus according to claim 10, wherein the indication comprises at least one of:
    location of the specific uplink subframe in which the random access preamble is to be transmitted;
    the random access preamble to be transmitted; and
    a resource on which the random access message 3 is to be transmitted.

17. An apparatus, comprising:
    circuitry configured to
       receive, from a user equipment, an indication indicating that a random access preamble is transmitted to a base station in a specific uplink subframe on a first component carrier;
       determine not to schedule downlink transmission in a downlink subframe on a second component carrier overlapping the specific uplink subframe on the first component carrier; and
       receive, from the user equipment, a random access message 3 in the specific uplink subframe on the first component carrier.

18. The apparatus according to claim 17, wherein the indication is received in an uplink control channel.

19. The apparatus according to claim 18, wherein the circuitry is further configured to predefine the uplink control channel for such indications that a random access preamble is to be transmitted.

20. The apparatus according to claim 17, wherein
    the circuitry is of a base station,
    the secondary component carrier is a primary component carrier for the user equipment and the first component carrier is a secondary component carrier for the user equipment, and
    the circuitry is further configured to trigger the user equipment for a contention based random access procedure on the secondary component carrier for uplink synchronization, and receive the indication from the user equipment in response to the trigger.

* * * * *